(12) United States Patent
Goldin et al.

(10) Patent No.: US 7,624,715 B2
(45) Date of Patent: Dec. 1, 2009

(54) SYSTEM AND METHOD FOR CONTROLLING TURBULENCE IN A COMBUSTION ENGINE

(75) Inventors: Iliya Goldin, Auburn Hills, MI (US); Eric F. Grimminger, Rochester Hills, MI (US); Radha Iyer, Rochester Hills, MI (US); Debora J. Rapelje, Troy, MI (US); Tony A. Price, Oakland County, MI (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 11/866,019

(22) Filed: Oct. 2, 2007
(Under 37 CFR 1.47)

(65) Prior Publication Data

US 2009/0084335 A1  Apr. 2, 2009

(51) Int. Cl.
*F02D 9/10* (2006.01)
*F02D 9/14* (2006.01)

(52) U.S. Cl. .................................................. 123/336

(58) Field of Classification Search ................. 123/336, 123/337, 306, 432, 590, 184.21, 184.45
See application file for complete search history.

(56) References Cited

U.S. PATENT DOCUMENTS

| | | | | |
|---|---|---|---|---|
| 5,636,605 A | * | 6/1997 | Nomizo et al. ......... | 123/184.61 |
| 5,875,758 A | * | 3/1999 | Fujita ..................... | 123/336 |
| 5,957,096 A | | 9/1999 | Clarke et al. | |
| 5,979,401 A | | 11/1999 | Hickey | |
| 6,155,229 A | | 12/2000 | Cantrell, Jr. et al. | |
| 6,389,803 B1 | | 5/2002 | Surnilla et al. | |
| 6,394,066 B1 | | 5/2002 | Chou et al. | |
| 6,662,772 B1 | * | 12/2003 | Murphy ................. | 123/184.21 |
| 7,293,546 B1 | * | 11/2007 | Confer et al. ............ | 123/308 |
| 2005/0189513 A1 | * | 9/2005 | Ino et al. ................. | 251/308 |
| 2008/0035107 A1 | * | 2/2008 | Torii ....................... | 123/336 |

* cited by examiner

*Primary Examiner*—Mahmoud Gimie
(74) *Attorney, Agent, or Firm*—Thompson Hine LLP; Joseph V. Tassone

(57) ABSTRACT

A system for controlling turbulence in a combustion engine having a composite upper intake manifold and a cylinder head. The system includes a composite housing, a composite cartridge, a shaft, a radial gasket, a lever arm, and a press in place gasket. The composite housing includes an open first end and an open second end. The open second end defines a first cross-sectional area. The first end is configured to be welded to the composite upper intake manifold and the second end has a gasket groove. The second end is configured to be connected with the cylinder head. The composite cartridge is positioned within and removably joined with the second end of the composite housing. The composite cartridge includes a body, a flap valve, and bushings. The shaft connected to the flap valve within the composite housing. The press in place gasket is positioned within the gasket groove.

20 Claims, 5 Drawing Sheets

SYSTEM AND METHOD FOR CONTROLLING TURBULENCE IN A COMBUSTION ENGINE

BACKGROUND OF THE INVENTION (1) Field of the Invention

The present invention generally relates to improving performance of combustion engines. In particular, the present invention is directed to a system and method for controlling turbulence in a combustion engine.

(2) Description of the Related Art

Manufacturers are continually trying to improve engine performance and fuel economy while also reducing undesirable emissions. To achieve this, internal combustion engines are being designed to improve the mixing of intake air and injected fuel in the combustion chamber and to direct the flow of air and air-fuel mixture in order to provide an optimum mixture. The use of tumble and/or swirl flows of air in the combustion chamber have been used in an effort to achieve an optimum air-fuel mixture.

Various control valves have been used within internal combustion engines in order to introduce swirl flows of air and fuel into the engine's cylinders. The control valves are used to alter the flow of air into the cylinder during certain vehicle operating modes (e.g., during relatively low engine speed and load conditions), and are generally effective to create turbulence within the cylinder, thereby improving combustion within the cylinder.

In order to be more efficient at low revolutions per minute (rpms), swirl can be introduced to have a better mixing of the air and fuel in the runner before the intake valve. Swirl inducing valves are typically designed to substantially block an air intake runner at low rpm, which increases air velocity, thereby introducing swirl as it flows through the opening in the valve. This flow of air into the cylinder creates a swirling effect or turbulence, which causes the fuel rich mixture and fuel lean mixture to combine and provide improved combustion. At high rpms when the air velocity is fast, the valve opens.

While open, the valve can restrict some of the airflow since it can be an obstruction in the runner. This result is not desirable. Air pulsations applied to the valve can cause noise and vibration. The valve can be subject to high stress and heat during specific events such as backfire. Installation of swirl-inducing valves is often expensive and requires machining processes.

BRIEF SUMMARY OF THE INVENTION

One aspect of the present invention is a system for controlling turbulence in a combustion engine having a composite upper intake manifold and a cylinder head. The system includes a composite housing, a composite cartridge, a shaft, a radial gasket, a lever arm, and a press in place gasket. The composite housing includes an open first end, an open second end, and side walls spanning between the first and second ends. The open second end defines a first cross-sectional area. The side walls have interior and exterior surfaces, which include openings therethrough adjacent the second end. The first end is configured to be welded to the composite upper intake manifold and the second end has a gasket groove. The second end is configured to be connected with the cylinder head. The composite cartridge is positioned within and removably joined with the second end of the composite housing thereby reducing the first cross-sectional area to define a second cross-sectional area. The composite cartridge includes a body, a flap valve, and bushings. The body includes surfaces interior to the composite housing and includes holes through opposite ones of the surfaces interior to the composite housing. The flap valve has first and second ends and a middle portion therebetween that has a surface area that is less than the second cross-sectional area. The bushings are joined with the first and second ends of the flap valve and have a central opening. The bushings are configured to rotate within the holes in the surfaces interior to the composite housing. The shaft includes a first end that is inserted through the openings in the composite housing, the central opening in the bushings, and the holes in the surfaces interior to the composite housing. The shaft is rotatably and slidably connected to the flap valve within the composite housing. The shaft includes a second end that protrudes from the composite housing. The radial gasket and lever arm are joined with the second end of the shaft. The press in place gasket is positioned within the gasket groove in the second end of the composite housing.

Another aspect of the invention is a system for controlling turbulence in a combustion engine having a composite upper intake manifold and a cylinder head. The system includes a composite housing, a composite cartridge, a shaft, a radial gasket, a lever arm, an end cap, and a single continuous press in place gasket. The composite housing includes an at least partially cylindrical body having an open first end and an open second end and sidewalls spanning between the first and second ends. The open second end defines a first cross-sectional area. The side walls have interior and exterior surfaces. Opposite ones of the interior and exterior surfaces adjacent the second end have openings therethrough. The first end is configured to be welded to the composite upper intake manifold and the second end has a gasket groove. The second end is configured to be connected with the cylinder head. The composite cartridge is positioned within and removably joined with the second end of the composite housing thereby reducing the first cross-sectional area to define a second cross-sectional area. The composite cartridge includes a body, a flap valve, and bushings. The body has surfaces interior to the at least partially cylindrical body. Opposite ones of the surfaces interior to the at least partially cylindrical body include holes. The flap valve has first and second ends and a middle portion therebetween that has a surface area that is less than the second cross-sectional area. The flap valve includes a connecting portion having an opening with a non-round cross-section. The bushings are joined with the first and second ends of the flap valve and have a central opening. The bushings are configured to rotate within the holes in the surfaces interior to the at least partially cylindrical body. The shaft has a cross-section substantially equivalent to the non-round cross-section of the opening of the connecting portion of the flap valve. The shaft includes a first end that is inserted through the openings in the composite housing, the central opening in the bushings, the opening in the connecting portion, and the holes in the surfaces interior to the at least partially cylindrical body. The flap valve is thereby rotatably and slidably connected to the shaft. The shaft includes a second end that protrudes from the composite housing. The radial gasket is joined with the second end of the shaft thereby sealing the opening in the composite housing adjacent the second end. The lever arm is joined with the second end of the shaft such that the shaft causes the flap valve to rotate within the composite housing when the lever arm is rotated. The end cap is positioned on top of the lever arm and joined with the composite housing to secure the lever arm to the composite housing. The single continuous press in place gasket is positioned within the gasket groove in the second end of the composite housing.

Still another aspect of the invention is a method of modifying a combustion engine having a composite upper intake manifold and a cylinder head to better control turbulence. The method includes the following steps: fabricating a module for controlling turbulence by attaching bushings to a flap valve, inserting the bushings and the flap valve in a composite cartridge, inserting the composite cartridge in a composite housing, the composite housing having a first end and a second end, inserting a single continuous press in place gasket within a gasket groove in the second end of the composite housing, inserting a shaft through the composite housing, the composite cartridge, the bushings, and the flap, and joining a lever arm to the shaft; positioning the composite housing on a welder thereby aligning the composite housing and the composite upper intake manifold; welding the first end of the composite housing to the composite upper intake manifold; and bolting the second end of the composite housing to the cylinder head.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
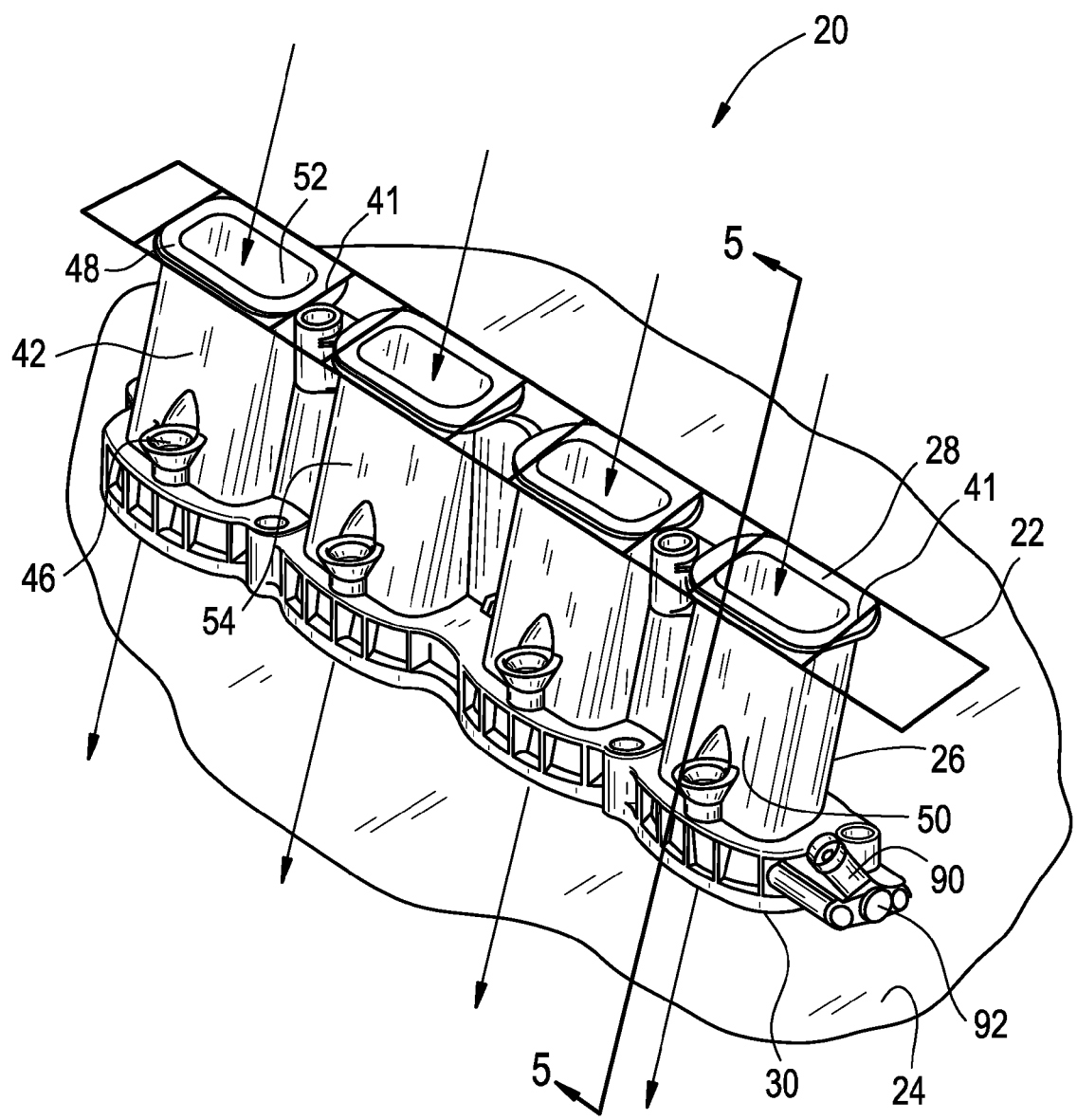
FIG. 1 is a front isometric view of a system according to one embodiment of the present invention.
Figure 2:
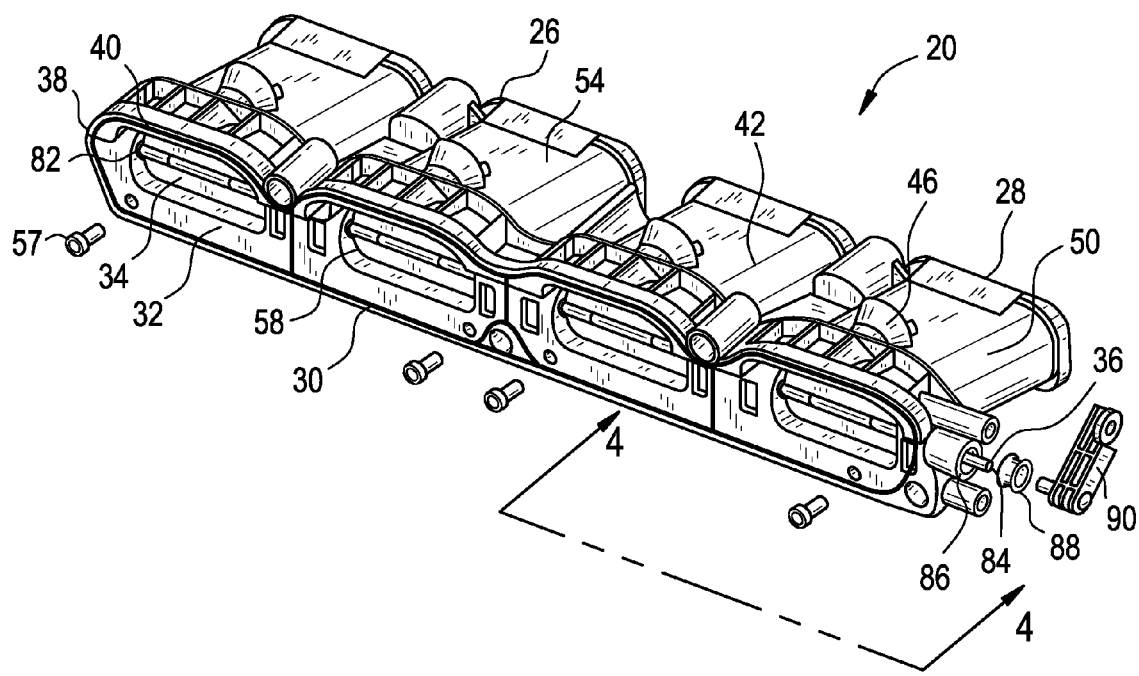
FIG. 2 is a bottom isometric view of a system according to one embodiment of the present invention.

Referring now to the drawings in which like reference numerals indicate like parts, and in particular, to FIGS. 1-5, one aspect of the present invention is a system 20 for controlling turbulence in a combustion engine having a composite upper intake manifold 22 and a cylinder head 24. In one embodiment, a composite housing 26 is welded to composite upper intake manifold 22 at a first end 28 and bolted to cylinder head 24 at a second end 30. A composite cartridge 32 including a flap valve 34 slidably mounted to a shaft 36 is positioned in the composite cartridge adjacent second end 30. Second end 30 includes a gasket groove 38 and a press in place gasket 40 to seal its connection to cylinder head 24. As indicated by the arrows in FIG. 1, air flows from runners 41 in upper intake manifold 22 into and through composite housing 26 and then into cylinder head 24.

Figure 3:
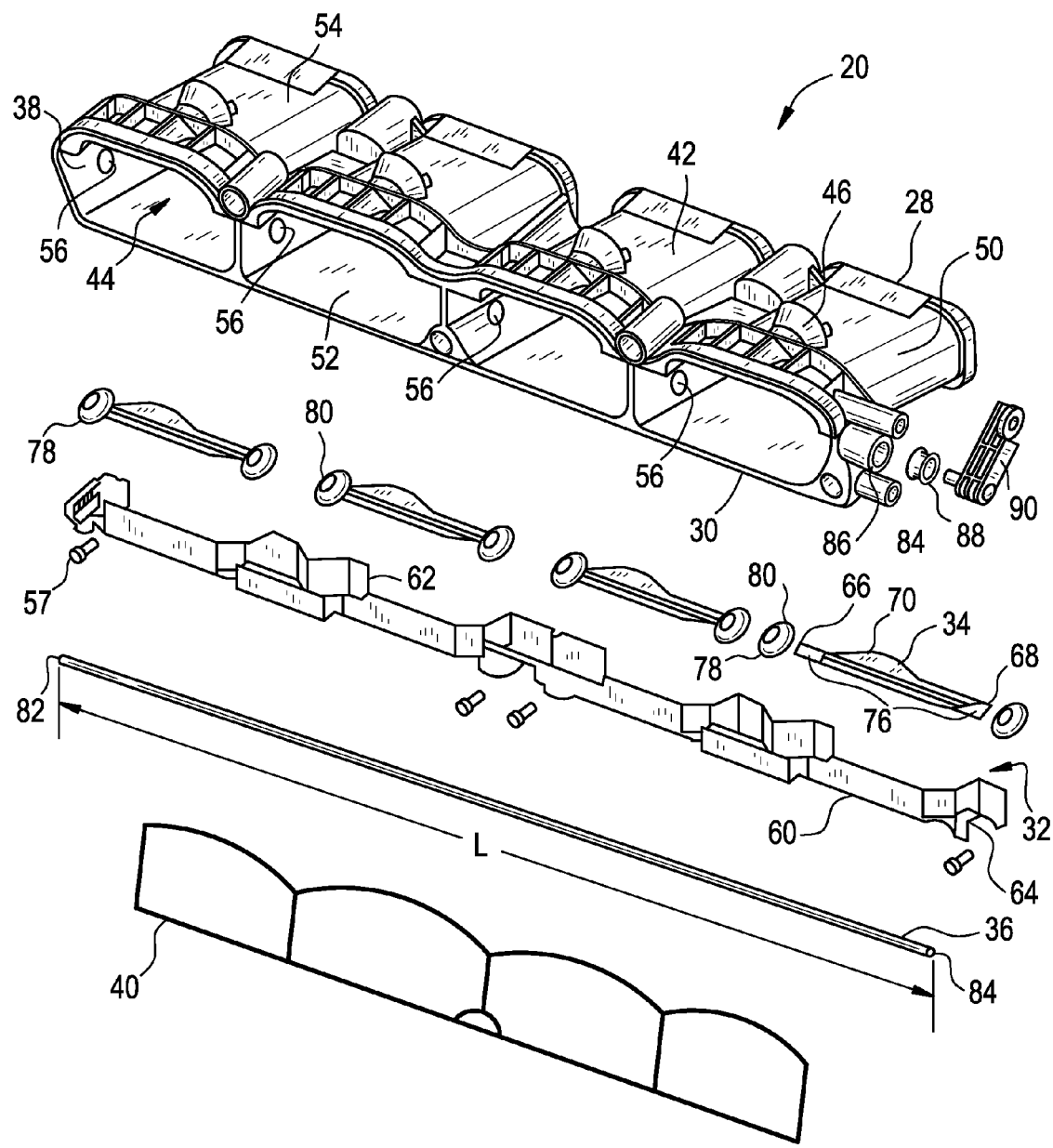
FIG. 3 is a an exploded view of the system illustrated in FIG. 2.

Referring now to FIG. 3, composite housing 26 includes a body 42, which is generally at least partially cylindrical. First end 28 and second end 30 are generally open and the second end includes an opening 44 defined by a first cross-sectional area. In addition to gasket groove 38, second end may also include bolt holes 46 for bolting composite housing 26 to cylinder head 24. As best illustrated in FIG. 1, first end 28 is generally configured to be welded to composite upper intake manifold 22 and may include a weld bead 48. In one embodiment, weld bead 48 is a vibration weld bead for vibration welding first end 28 to composite upper intake manifold 22. Side walls 50 span between first and second ends 28 and 30. Side walls 50 have interior and exterior surfaces 52 and 54, respectively. Side walls 50 include openings 56 through opposite ones of interior and exterior surfaces 52 and 54 adjacent second end 30.

Composite cartridge 32 is typically positioned within and removably joined with second end 30 of composite housing 26. Typically, screws 57 are used to join composite cartridge 32 to second end 30 of composite housing 26. Insertion of composite cartridge 32 into composite housing 26 reduces the first cross-sectional area of opening 44 in second end 30 to define an opening 58 having a smaller second cross-sectional area. Composite cartridge 32 includes a body 60 having surfaces 62 interior to body 42. Body 60 includes holes 64 through opposite ones of surfaces 62.

Figure 4:
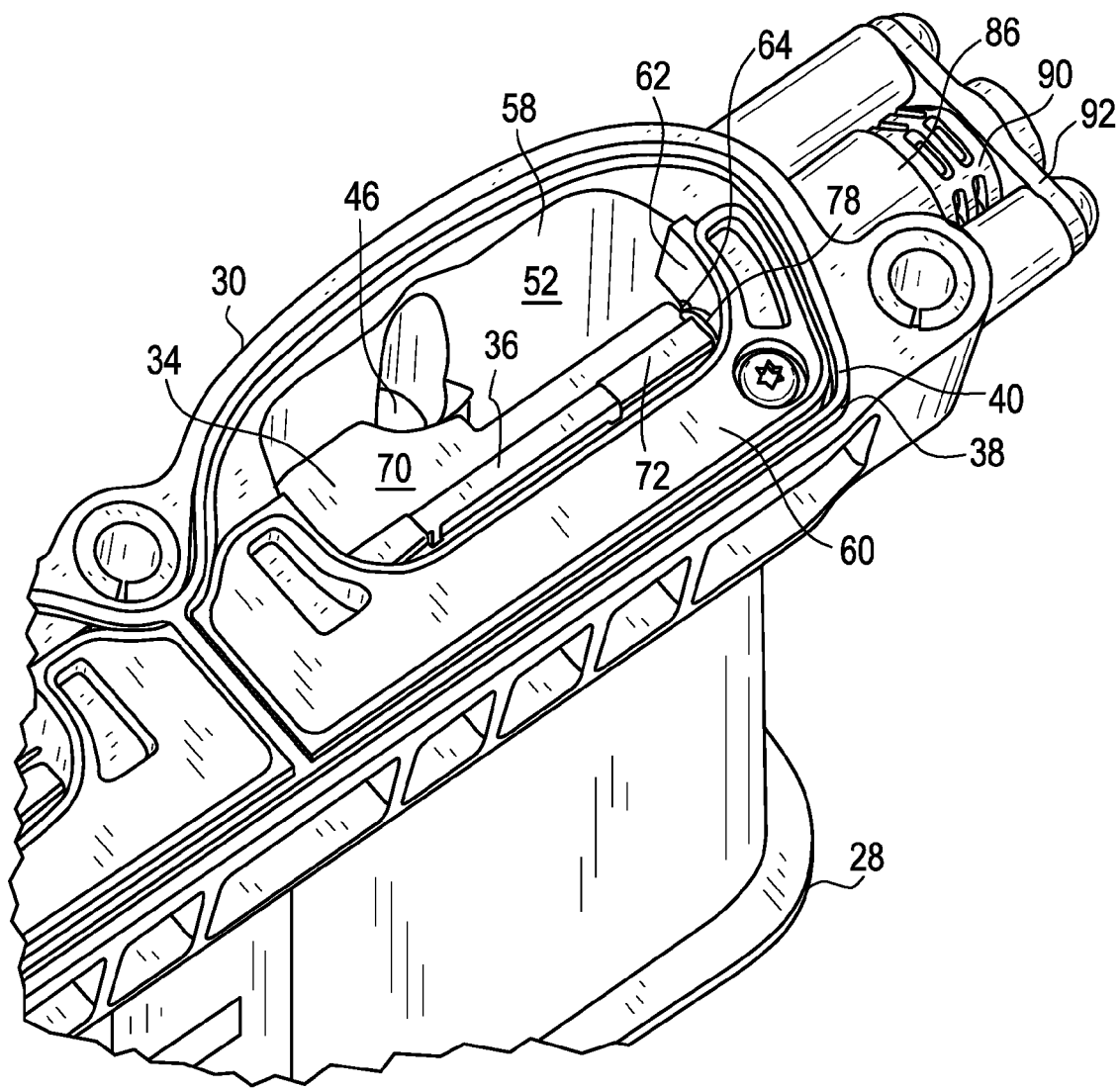
FIG. 4 is an enlarged partial view taken along line 4-4 of FIG. 2.
Figure 5:
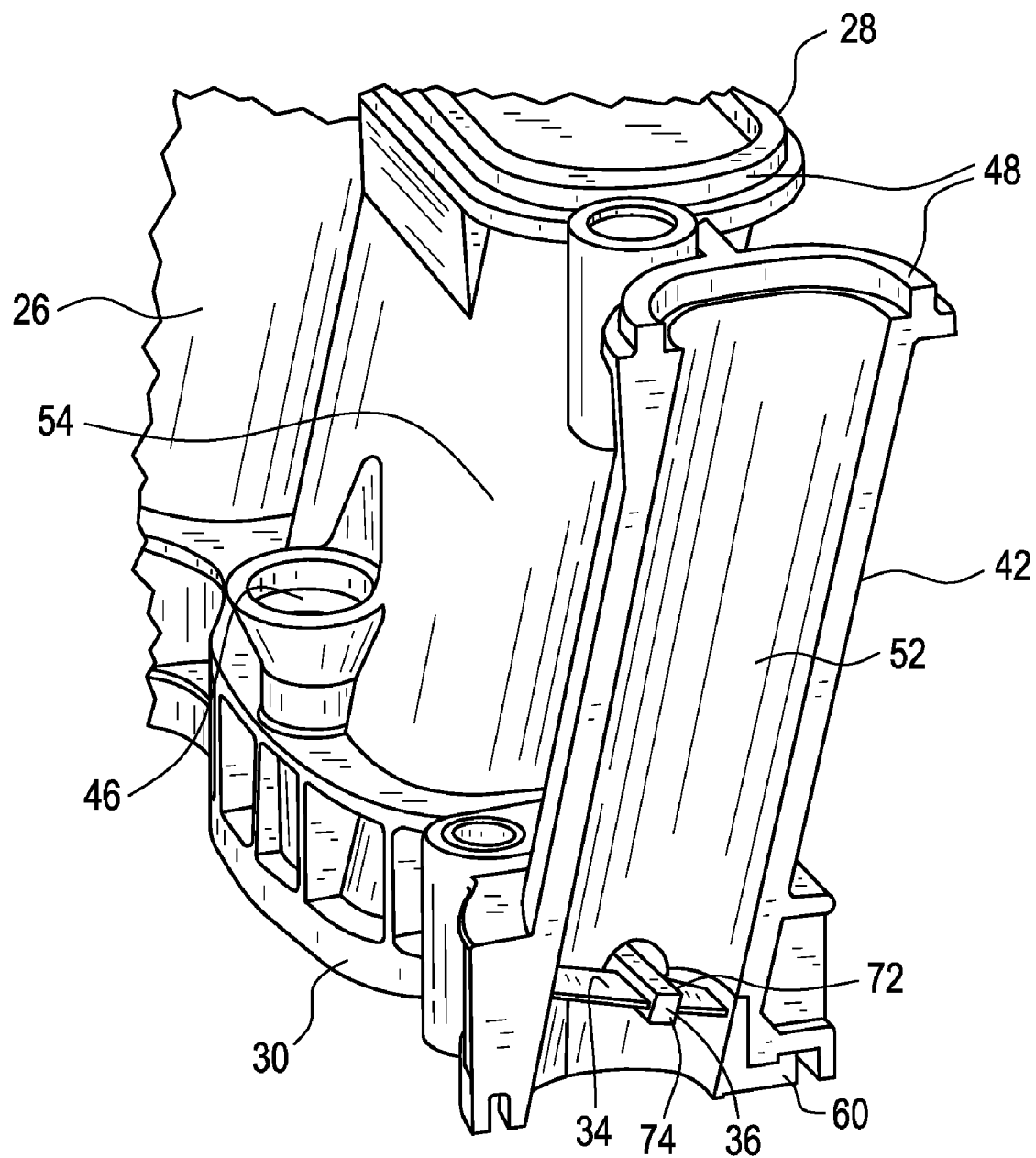
FIG. 5 is an end isometric cross-section taken along line 5-5 of FIG. 1.

As best illustrated in FIGS. 3-5, flap valve 34 includes first and second ends 66 and 68 and a middle portion 70 therebetween. Middle portion 70 includes a surface area that is less than the second cross-sectional area of opening 58. Typically, middle portion 70 includes a surface area that is about seventy-five percent of the second cross-sectional area of opening 58. Flap valve 34 includes a connecting portion 72 that generally has an opening 74 with a non-round cross-section. Flap valve 34 is typically fabricated from stamped steel and includes a composite over-molded bearing surface 76 on each of first and second ends 66 and 68.

Bushings 78 are typically joined with first and second ends 66 and 68 of flap valve 34. Bushings 78 are typically round and generally have a central opening 80. Bushings 78 are typically configured to rotate within holes 64 in body 60 of composite cartridge 32. Bushings 78 are generally in contact with composite over-molded bearing surfaces 76 of flap valve 34. Bushings 78 are typically fabricated from aluminum or other relatively hard materials and encased in rubber or similar material. The rubber generally compensates for the increased tolerance of molding a composite part as well as thermal deformation of composite housing 26 bolted to aluminum head 24.

Shaft 36 generally includes a cross-section substantially equivalent to the non-round cross-section of opening 74 of connecting portion 72 of flap valve 34. Shaft 36 includes a first end 82 that is inserted through openings 56 in side walls 50 of composite housing 26, central opening 80 in bushings 78, opening 74 in connecting portion 72, and holes 64 in surfaces 62 interior of composite cartridge 32. Flap valve 34 is generally rotatably and slidably connected to shaft 36 in that it may slide along a length L of the shaft within body 42 and that it generally rotates in-sync with the shaft. In this way, flap valve 34 is self-aligning along length L of shaft 36. Shaft 36 includes a second end 84 that protrudes from an end 86 of composite housing 26.

A radial gasket 88 and lever arm 90 are typically joined with second end 84 of shaft 36. Radial gasket 88 seals opening 56 in composite housing 26 adjacent second end 84. Lever arm 90 is joined with second end 84 of shaft 36 such that the shaft causes flap valve 34 to rotate within composite housing 26 when the lever arm is rotated. Lever arm 90 is generally fabricated from a low friction composite material or a low friction plastic. An end cap 92 may be positioned over lever arm 90 and joined with composite housing 26 to secure the lever arm to the composite housing.

Press in place gasket 40 is typically positioned within gasket groove 38 in second end 30 of composite housing 26. Press in place gasket 40 encompasses composite cartridge 32 and seals the connection between composite housing 26 and cylinder head 24.

Another embodiment of the present invention is a method of modifying a combustion engine having a composite upper intake manifold and a cylinder head to better control turbulence. The method first includes fabricating a module for controlling turbulence according to the following steps: attaching bushings to a flap valve; inserting the bushings and the flap valve in a composite cartridge; inserting the composite cartridge in a composite housing, the composite housing having a first end and a second end; inserting a single continuous press in place gasket within a gasket groove in the second end of the composite housing; inserting a shaft through the composite housing, the composite cartridge, the bushings, and the flap valve; and joining a lever arm to the shaft. Next, the composite housing is positioned on a welder to align the composite housing and the composite upper intake manifold. Then, the first end of the composite housing is welded to the composite upper intake manifold. Next, the second end of the composite housing is bolted to the cylinder head. In one embodiment, the first end of the composite housing is vibration welded to the composite upper intake manifold.

The present invention has advantages over prior art designs. Embodiments of the present inventions offer cost benefits over known designs. The use of composite materials such as plastic is more cost effective over an aluminum cast and machine solution. Vibration welding the composite housing to the upper intake manifold eliminates a set of gaskets, which are typically used to seal the housing to the upper intake manifold. The use of a steel, non-machined shaft is less expensive than machined shafts often used. The flap valves used in the present invention are attached more economically than others known in the art in that they slide on the shaft while others are riveted to the shaft. The use of a press in place gasket offers cost savings over gasket carriers. Press in place gaskets may be used on the right or left bank thereby simplifying manufacturing and reducing cost. The use of a press in place gasket also greatly reduces volume and surface area at the cylinder head joint over a joint having a gasket carrier. The use of a common cartridge assembly and shaft simplifies manufacturing thereby lowering cost.

In addition to reduced costs, the present invention design also offers improved performance over known designs. By providing tighter tolerances, performance is improved. The bank-to-bank tolerance is tighter than most existing designs due to the separation of the upper manifold to the system. The composite housing of the present invention can be positioned on a welder prior to welding it to the upper intake manifold thereby eliminating shrinkage and warpage problems over designs that are integrated into the manifold. The increased tolerance bank-to-bank aligns the port openings better from the manifold to the cylinder head to help reduce a step due to mismatch. The presence of a step may cause an interruption in airflow and thus a reduction in performance. The independent location of the flap valve inside the runner opening, i.e., composite housing, allows for a tighter profile tolerance between the flap valve and the runner to provide a better closed-condition for introducing swirl. Fuel puddleing can reduce performance and hurt emissions. By eliminating one joint over aluminum designs, the present invention designs eliminate one area of fuel puddleing.

The present invention also offers improved reliability over known designs. The bushings and bearing area of the flap valves generally have tight tolerances on a running fit and do not affect torque. The independent location of the flap valve inside the runner opening helps compensate for the thermal expansion rates of the different materials. This allows the system to respond the same at a variety of engine temperatures without affecting the load on the system actuator, which provides torque for the system. This will increase the life of the actuator. The bearing surface of the lever arm is internal and sealed from the harsh under-hood environment. This will increase the life of the lever arm. The use of composite materials and rubber over moldings in the present invention also offers reduced noise, vibration, and harshness (NVH) over known designs. The designs of the present invention are also modular, may be used across product lines, and are lighter than aluminum designs.

The use of self-aligning flap valves helps lower the bending moment and inducing flexibility. These factors contribute in the compensation of misalignment of the bushing for all conditions of the composite solution. The ability to compensate for misalignment decreases the amount of torque the system will need to rotate from closed to open positions, therefore increasing reliability of the system and actuator.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. A system for controlling turbulence in a combustion engine having a composite upper intake manifold and a cylinder head, said system comprising:

a composite housing including an open first end and an open second end and side walls spanning between said first and second ends, said open second end defining a first cross-sectional area, said sides walls having interior and exterior surfaces, said side walls including openings through opposite ones of said interior and exterior surfaces adjacent said second end, said first end being configured to be welded to the composite upper intake manifold and said second end having a gasket groove and said second end being configured to be connected with the cylinder head;

a composite cartridge positioned within and removably joined with said second end of said composite housing, wherein the composite cartridge reduces said first cross-sectional area to define a second cross-sectional area, said composite cartridge further comprising:

a body having surfaces interior to said composite housing, said body including holes through opposite ones of said surfaces interior to said composite housing;

a flap valve having first and second ends and a middle portion therebetween that has a surface area that is less than said second cross-sectional area; and bushings joined with said first and second ends of said flap valve, said bushings having a central opening and said bushings being configured to rotate within said holes in said surfaces interior to said composite housing;

a shaft including a first end that is inserted through said openings in said composite housing, said central opening in said bushings, and said holes in said surfaces interior to said composite housing, said shaft being rotatably and slidably connected to said flap valve within said composite housing, said shaft including a second end that protrudes from said composite housing;

a radial gasket joined with said second end of said shaft;

a lever arm joined with said second end of said shaft; and a press in place gasket positioned within said gasket groove in said second end of said composite housing.

2. A system according to claim 1, wherein said composite body is at least partially cylindrical.

3. A system according to claim 1, wherein said flap includes a connecting portion having an opening with a non-round cross-section.

4. A system according to claim 3, wherein said shaft having a cross-section substantially equivalent to said non-round cross-section of said opening of said connecting portion of said flap valve.

5. A system according to claim 1, wherein said radial gasket seals said opening in said composite housing adjacent said second end.

6. A system according to claim 1, wherein when said lever arm is rotated it causes said shaft to rotate, which causes said flap to rotate within said composite housing.

7. A system according to claim 1, further comprising an end cap positioned on top of said lever arm and joined with said composite housing to secure said lever arm to said composite housing.

8. A system according to claim 1, wherein said first end is configured to be vibration welded to the composite upper intake manifold.

9. A system according to claim 1, wherein said flap is fabricated from stamped steel and includes a composite over-molded bearing surface on each of said ends.

10. A system according to claim 1, wherein said composite over-molded bearing surfaces contact said bushings.

11. A system according to claim 1, wherein said flap slides along a length of said shaft thereby self-aligning.

12. A system according to claim 1, wherein said bushings are fabricated from steel encased in rubber.

13. A system for controlling turbulence in a combustion engine having a composite upper intake manifold and a cylinder head, said system comprising:
- a composite housing having an at least partially cylindrical body including an open first end and an open second end and side walls spanning between said first and second ends, said open second end defining a first cross-sectional area, said sides walls having interior and exterior surfaces, said side walls including openings through opposite ones of said interior and exterior surfaces adjacent said second end, said first end being configured to be welded to the composite upper intake manifold and said second end having a gasket groove and said second end being configured to be connected with the cylinder head;
- a composite cartridge positioned within and removably joined with said second end of said composite housing, wherein the composite cartridge reduces said first cross-sectional area to define a second cross-sectional area, said composite cartridge further comprising:
- a body having surfaces interior to said at least partially cylindrical body, said body including holes through opposite ones of said surfaces interior to said at least partially cylindrical body;
- a flap valve having first and second ends and a middle portion therebetween that has a surface area that is less than said second cross-sectional area, said flap valve including a connecting portion having an opening with a non-round cross-section; and
- bushings joined with said first and second ends of said flap valve, said bushings having a central opening and said bushings being configured to rotate within said holes in said surfaces interior to said at least partially cylindrical body;
- a shaft having a cross-section substantially equivalent to said non-round cross-section of said opening of said connecting portion of said flap valve, said shaft including a first end that is inserted through said openings in said composite housing, said central opening in said bushings, said opening in said connecting portion, and said holes in said surfaces interior to said at least partially cylindrical body thereby rotatably and slidably connecting said flap valve to said shaft, said shaft including a second end that protrudes from said composite housing;
- a radial gasket joined with said second end of said shaft thereby sealing said opening in said composite housing adjacent said second end;
- a lever arm joined with said second end of said shaft such that said shaft causes said flap valve to rotate within said composite housing when said lever arm is rotated;
- an end cap positioned on top of said lever arm and joined with said composite housing to secure said lever arm to said composite housing; and
- a single continuous press in place gasket positioned within said gasket groove in said second end of said composite housing.

14. A system according to claim 13, wherein said first end is configured to be vibration welded to the composite upper intake manifold.

15. A system according to claim 13, wherein said flap is fabricated from stamped steel and includes a plastic over-molded bearing surface on each of said ends.

16. A system according to claim 13, wherein said plastic over-molded bearing surfaces contact said bushings.

17. A system according to claim 13, wherein said flap slides along a length of said shaft thereby self-aligning.

18. A system according to claim 13, wherein said bushings are fabricated from aluminum encased in rubber.

19. A method of modifying a combustion engine having a composite upper intake manifold and a cylinder head to better control turbulence, said method comprising:
- fabricating a module for controlling turbulence by attaching bushings to a flap valve, inserting said bushings and said flap valve in a composite cartridge, inserting said composite cartridge in a composite housing, said composite housing having a first end and a second end, said second end defining a first cross-sectional area, inserting a single continuous press in place gasket within a gasket groove in said second end of said composite housing, inserting a shaft through said composite housing, said composite cartridge, said bushings, and said flap, and joining a lever arm to said shaft;
- positioning said composite housing on a welder thereby aligning said composite housing and the composite upper intake manifold;
- welding said first end of said composite housing to the composite upper intake manifold; and
- bolting said second end of said composite housing to the cylinder head;
- wherein the composite cartridge reduces said first cross-sectional area to define a second cross-sectional area.

20. A method according to claim 19, wherein said first end of said composite housing is vibration welded to the composite upper intake manifold.

* * * * *